(12) United States Patent
Goud et al.

(10) Patent No.: US 11,762,681 B2
(45) Date of Patent: Sep. 19, 2023

(54) DYNAMIC CONFIGURATION OF VIRTUAL OBJECTS

(71) Applicant: VMware, Inc., Palo Alto, CA (US)

(72) Inventors: Avinash Goud, Palo Alto, CA (US); Aniket Sakhardande, Palo Alto, CA (US); Praveen Vegulla, Cupertino, CA (US); Rajesh Venkatasubramanian, San Jose, CA (US); Maarten Wiggers, Palo Alto, CA (US); Keith Farkas, Palo Alto, CA (US); Derek Beard, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 289 days.

(21) Appl. No.: 17/190,325

(22) Filed: Mar. 2, 2021

(65) Prior Publication Data

US 2022/0283836 A1    Sep. 8, 2022

(51) Int. Cl.
*G06F 9/455* (2018.01)
*G06F 9/50* (2006.01)
*G06F 9/445* (2018.01)

(52) U.S. Cl.
CPC ...... *G06F 9/45558* (2013.01); *G06F 9/44505* (2013.01); *G06F 9/45545* (2013.01); *G06F 9/5077* (2013.01); *G06F 2009/45591* (2013.01)

(58) Field of Classification Search
CPC ............. G06F 9/45558; G06F 9/44505; G06F 9/45545; G06F 9/5077; G06F 2009/45591; G06F 2009/45575; G06F 9/502

See application file for complete search history.

(56) References Cited

U.S. PATENT DOCUMENTS

| | | | |
|---|---|---|---|
| 8,141,090 B1* | 3/2012 | Graupner | G06F 9/5077 |
| | | | 718/1 |
| 2008/0104590 A1* | 5/2008 | McCrory | G06F 9/45558 |
| | | | 718/1 |
| 2014/0059379 A1* | 2/2014 | Ren | G06F 11/1484 |
| | | | 714/15 |
| 2015/0254088 A1 | 9/2015 | Chou et al. | |
| 2017/0052825 A1* | 2/2017 | Cropper | G06F 9/5061 |
| 2019/0041830 A1 | 2/2019 | Yarvis et al. | |
| 2019/0317826 A1* | 10/2019 | Jain | G06F 9/5077 |
| 2019/0373052 A1 | 12/2019 | Pollitt et al. | |
| 2020/0019444 A1 | 1/2020 | Rao et al. | |

(Continued)

OTHER PUBLICATIONS

U.S. Appl. No. 17/153,296, filed Jan. 20, 2021.

*Primary Examiner* — Dong U Kim
(74) *Attorney, Agent, or Firm* — Patterson + Sheridan, LLP

(57) ABSTRACT

The disclosure provides an approach for the dynamic configuration of virtualized objects. A virtual object may be associated with a desired state defining a first plurality of resources for allocating to the virtual object. The first plurality of resources correspond to one or more resource types. Techniques include determining that each of a plurality of hosts does not have sufficient available resources to allocate the first plurality of resources to the virtual object according to the desired state. Techniques include selecting a first host of the plurality of hosts to run the virtual object. Techniques include allocating a second plurality of resources to the virtual object from the first host, wherein the second plurality of resources is less than the first plurality of resources, and running the virtual object in the first host.

20 Claims, 5 Drawing Sheets

(56) References Cited

U.S. PATENT DOCUMENTS

| | | |
|---|---|---|
| 2020/0327615 A1 | 10/2020 | Frenkel et al. |
| 2021/0117241 A1 | 4/2021 | Xia |
| 2021/0224093 A1 | 7/2021 | Fu et al. |
| 2022/0229678 A1 | 7/2022 | Beard et al. |

* cited by examiner

DYNAMIC CONFIGURATION OF VIRTUAL OBJECTS

BACKGROUND

A software defined datacenter (SDDC) involves multiple hosts in communication over a physical network infrastructure. Each host has one or more virtualized endpoints, such as virtual machines (VMs), containers, or other virtual computing instances (VCIs). The virtualized endpoints may be connected to logical overlay networks that may span multiple hosts and are decoupled from the underlying physical network infrastructure. Though certain aspects are discussed herein with respect to VMs, it should be noted that they may similarly be applicable to other suitable virtualized endpoints.

The SDDC generally involves the use of a management plane and a control plane. The management plane receives network configuration input, such as from an administrator or orchestration automation, and generates desired state data that specifies how the logical network is implemented in the physical infrastructure. The control plane determines a logical overlay network topology and maintains information about network entities such as logical switches, logical routers, endpoints, etc. The logical topology information is translated by the control plane into network configuration data that is then communicated to network elements of each host.

A virtualized infrastructure manager (VIM) in the management plane may communicate with the plurality of hosts. The VIM is configured to carry out administrative tasks, including, but not limited to, the management of hosts, the management of VMs running within each host, provisioning of VMs, transferring of VMs from one host to another host, and load balancing among hosts within the SDDC. The VIM may include a distributed resource scheduler (DRS) that intelligently allocates physical and/or logical resources of a host to optimize performance within the virtual infrastructure. Logical resources may refer to resources that are backed by physical resources, and may in certain aspects, correspond to a share portion (physical share portion, time share portion, etc.) of physical resources. Physical and/or logical resources may simply be referred to herein as "resources."

Multiple VMs can run on the same physical host, with the VMs sharing the physical resources of the host. The DRS balances computing workloads with available resources in the virtualized infrastructure. The DRS can be configured for manual or automatic control of the addition, removal, or reorganization of VM resources pools. Using resource pools that combine multiple host resources into one, the DRS enables optimal workload distribution on VMs based on workload needs and changing priorities. The DRS may recommend migration of VMs based on the availability and utilization of resources including, compute, memory, power, storage, and network resources.

When a host fails, a VM running on the host can failover to another host with available capacity that meets a configured resource demand of the VM. However, if DRS deems capacity to be inadequate across available hosts (e.g., resources of each available host are inadequate to meet the configured resource demand of the VM), DRS raises an event stating that it does not have enough resources to power on the VM. Thus, the VM suffers downtime until a suitable host is available (e.g., until a new host is powered on or a resource change among existing hosts occurs) which is both time-consuming to system administrators and interrupts access to service on the VM.

SUMMARY

Embodiments provide a method for the dynamic configuration of virtual objects, such as virtual machines (VMs), virtual computing instances (VCIs), or virtual disks. Embodiments include detecting a triggering event for configuring a virtual object, the virtual object being associated with a desired state defining a first plurality of resources for allocating to the virtual object; determining that each of a plurality of hosts does not have sufficient available resources to allocate the first plurality of resources to the virtual object according to the desired state; selecting a first host of the plurality of hosts to run the virtual object; allocating a second plurality of resources to the virtual object from the first host, wherein the second plurality of resources is less than the first plurality of resources; and running the virtual object in the first host using the allocated second plurality of resources.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for dynamic configuration of virtual objects.

Dynamic configuration of virtual objects, such as virtual machines (VMs), may be introduced to eliminate the downtime of VMs during scenarios where resources among hosts in a host cluster are insufficient to meet the configured resource demand (e.g., desired state) of one or more VMs. In addition, dynamic configuration may allow upsizing of a VM to a desired state when the VM is running in a degraded state/configuration. DRS may consider the resource availability of each resource type among hosts, usage requirements, resource predictions, and/or relative priorities of VMs during a triggering event, such as initial placement, failover, load balancing, and/or other suitable events to make informed decisions about VM configuration. Based on the information extracted by DRS, a VM may be "right sized". "Right Sizing" may include downsizing or upsizing the amount and/or type of resources at the VM. Though certain aspects are discussed herein with respect to VMs, it should be noted that they may similarly be applicable to other suitable virtualized objects.

Figure 1:
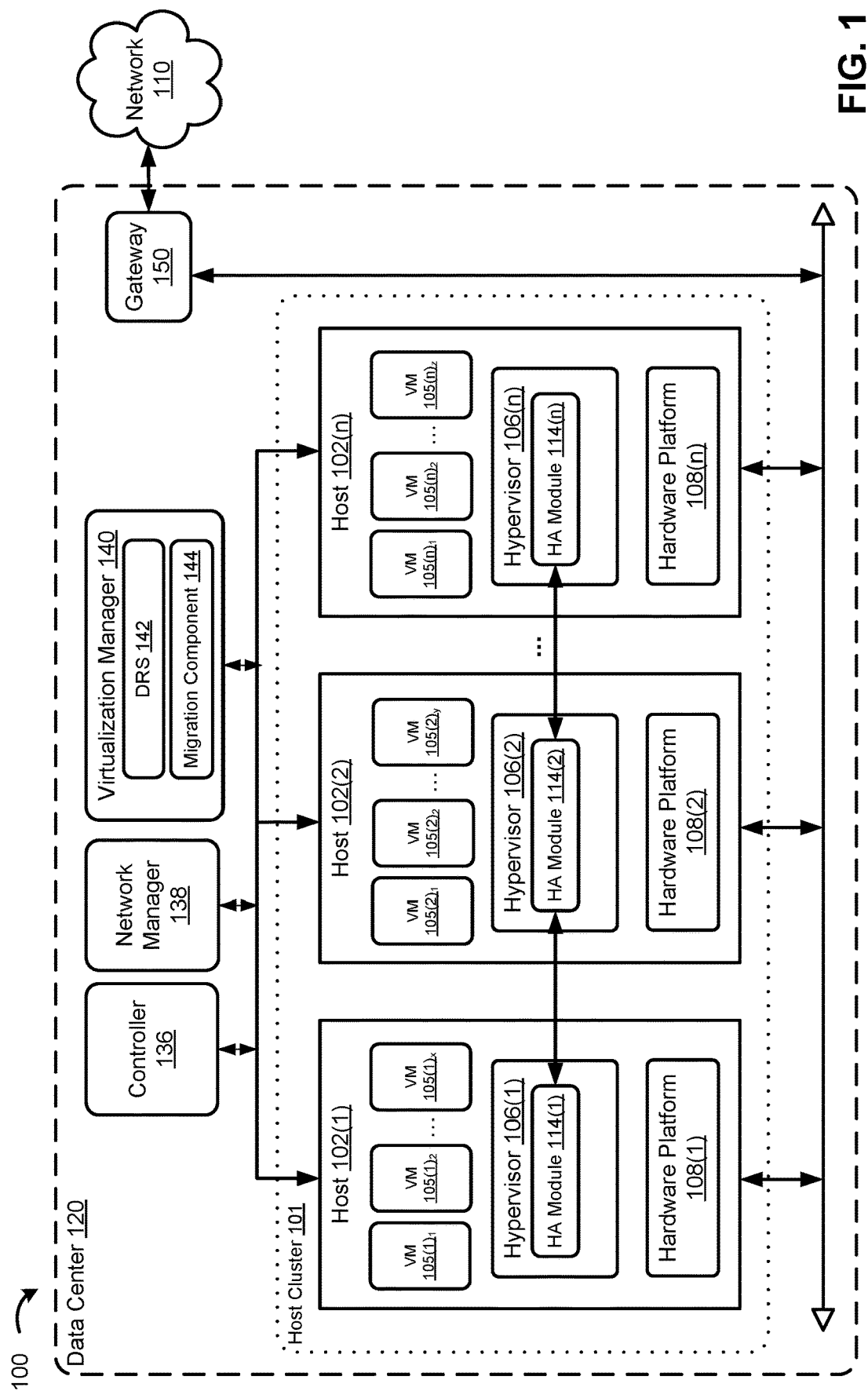
FIG. 1 depicts example physical and virtual network components with which embodiments of the present disclosure may be implemented.

FIG. 1 depicts example physical and virtual network components in a network environment 100 in which embodiments of the present disclosure may be implemented.

Networking environment 100 includes a set of networked computing entities, and may comprise a logical overlay network. As shown, networking environment 100 includes a data center 120 and network 110.

Network 110 may be a layer 3 (L3) physical network.

Data center 120 is an SDDC. Data center 120 includes a host cluster 101, a gateway 150, a controller 136, a network manager 138, and virtualization manager 140.

Host cluster 101 includes hosts 102(1) . . . (n) (collectively referred to as hosts 102). Each of hosts 102 may be constructed on a server grade hardware platform, such as hardware platforms 108(1) . . . (n) (collectively referred to as hardware platforms 108). An example of a hardware platform is an x86 architecture platform. Hosts 102 may be geographically co-located servers on the same rack or on different racks. Each host 102 is configured to provide a virtualization layer, also referred to as a hypervisor 106(1) . . . (n) (collectively referred to as hypervisors 106). The hypervisors 106 abstract processor, memory, storage, and networking physical resources of hardware platforms 108 into a number of virtual computer instances or virtual machines (VMs) $105(1)_1$-$105(1)_x$, $105(2)_1$-$105(2)_y$, $105(n)_1$-$105(n)_z$ (collectively referred to as VMs 105) on hosts 102. As shown, multiple VMs 105 may run concurrently on the same host. VMs 105 may include, for instance, containers, virtual appliances, and/or the like.

Each of hypervisors 106 may run in conjunction with an operating system (OS) (not shown) in its respective host 102. In some embodiments, hypervisors 106 can be installed as system level software directly on hardware platforms 108 of its respective host 102 (e.g., referred to as "bare metal" installation) and be conceptually interposed between the physical hardware and the guest OSs executing in the VMs 105. In certain aspects, each of hypervisors 106 implements a high availability (HA) module 114(1)-(n) (collectively referred to as HA modules 114). HA modules 114 allow for high availability of VMs 105 running within host cluster 101 to reduce downtime. For example, according to an example HA implementation, when HA is first turned on (for example, via a virtualization manager 140), HA modules 114 can communicate with each other to elect a master HA module. The master HA module is generally responsible for monitoring the health of hosts and VMs in the cluster, orchestrating VM failovers/restarts in case of a failure, and reporting cluster state and failover actions to virtualization manager 140. The remaining, non-master HA modules are generally responsible for monitoring and forwarding local host/VM state changes to the master HA module, and locally restarting VMs on its host system when directed by the master HA module.

When the master HA module detects a host failure, a VM failure, and/or a network outage, the master HA module can execute a failover/restart workflow for automatically restarting the VMs that are rendered inoperable by the failure. A host failure may be caused by a host reboot. A VM failure may be caused by a corrupt VMX configuration (e.g., causing the VM to crash), an All-Paths-Down (APD) situation, or a permanent device loss (PDL) situation. A network outage may be caused by a switch failure. At a high level, this workflow can include identifying the VMs to be restarted, placing those VMs on active host systems in host cluster 101 that have available capacity, and then transmitting commands to non-master HA modules on the respective host systems to initiate the restart process for each VM. In this manner, HA modules 114 help to ensure that the guest applications running within the affected VMs 105 remain operational throughout the outage.

Gateway 150 provides components in data center 120 with connectivity to network 110 and is used to communicate with destinations external to data center 120 (not shown). Gateway 150 may be a virtual computing instance, a physical device, or a software module running within each of hosts 102.

Controller 136 generally represents a control plane that manages configuration of VMs 105 within data center 120. Controller 136 may be a computer program that resides and executes in a central server in data center 120 or may run as a virtual appliance (e.g., a VM) in one of hosts 102. Although shown as a single unit, it should be understood that controller 136 may be implemented as a distributed or clustered system. That is, controller 136 may include multiple servers or VCIs that implement controller functions. Controller 136 is associated with one or more virtual and/or physical central processing units (CPUs) (not shown). Processor(s) resources allotted or assigned to controller 136 may be unique to controller 136, or may be shared with other components of data center 120.

Network manager 138 and virtualization manager 140 generally represent components of a management plane comprising one or more computing devices responsible for receiving logical network configuration inputs, such as from a network administrator, defining one or more endpoints (e.g., VMs, VCIs, and/or containers) and the connections between the endpoints, as well as rules governing communications between various endpoints.

In an embodiment, network manager 138 is a computer program that executes in a central server in networking environment 100 or may run in one of VMs (e.g., in one of hosts 102). Although shown as a single unit, it should be understood that network manager 138 may be implemented as a distributed or clustered system. That is, network manager 138 may include multiple servers or VMs/VCIs that implement management functions. Network manager 138 is configured to receive inputs from an administrator or other entity (e.g., via a web interface or application programming interface (API)) and carry out administrative tasks for data center 120, including centralized network management and providing an aggregated system view for a user.

In an embodiment, virtualization manager 140 is a computer program that executes in a central server in data center 120 (e.g., the same or a different server than the server on which network manager 138 executes) or runs in one of VMs 105. Virtualization manager 140 is configured to carry out administrative tasks for data center 120, including managing hosts 102, managing VMs 105 running within each of host 102, provisioning VMs 105, transferring VMs 105 from between hosts 102, transferring VMs 105 between data centers, transferring application instances between VMs 105 or between hosts 102, and load balancing among hosts 102 within data center 120. Virtualization manager 140 takes commands from components as to creation, migration, and deletion decisions of VMs 105 and application instances on data center 120. Virtualization manager 140 also makes independent decisions on management of local VMs 105 and application instances, such as placement of VMs 105 and application instances between hosts 102.

In an embodiment, virtualization manager 140 includes a distributed resource scheduler (DRS) 142. DRS 142 is a utility that works on host cluster 101 to provide resource management capabilities like load balancing and VM placement to provide optimized performance for hosts 102 and VMs 105. For example, when a VM 105 is powered on within host cluster 101, DRS 142 recommends placement of the VM 105 in an appropriate host 102 or generates a recommendation for placement, depending on automation levels (e.g., migrations thresholds of each host 102). DRS 142 seeks to balance computing workloads among operating VMs 105 with available resources in the virtualized infrastructure. Based on automation levels within host cluster 101, DRS 142 recommends migration of VMs 105 from an original host 102 to another host 102 within cluster 101 to maximize performance.

While FIG. 1 illustrates DRS 142 in virtualization manager 140, other embodiments may include DRS 142 in each HA module 114. HA module 114 elected as the master HA module may run the DRS Service (i.e., the master HA module and DRS run on the same host). In another embodiment, DRS 142 may run in a subset of VMs 105. The master HA module may include a default scheduler for powering on the subset of VMs 105 after a failure. In some cases, the default scheduler may be a simple scheduler (e.g., in cases where VMs 105 may always be allocated resources that meet their "desired state", described in detail below).

In some embodiments, virtualization manager 140 also includes a migration component 144 that performs migration of VMs 105 between hosts 102, such as by live migration. Migration component 144 acts in accordance with a recommendation from DRS 142 by migrating a VM 105 to another host 102 within host cluster 101 or in another host cluster indicated by DRS 142. DRS 142 may recommend placement and migration of VMs 105 to migration component 144 during, for example, scenarios involving load balancing. However, during failover, APD/PDL situations, or network outages, DRS 142 may recommend placement and migration of VMs 105 to a master HA module.

One or more VMs 105 may be migrated for the purpose of performing maintenance on the original host, to balance loads, to collocate VMs 105 that communicate with each other, to move VMs 105 apart to minimize fault domain, to migrate to a new server hardware, to migrate VMs during a failover, etc. In an example scenario, a master HA module triggers failover for a VM 105 and checks with DRS 142 for recommendations (or determines placement of a VM 105 via a local algorithm if DRS is unavailable). Master HA module acts in accordance with a recommendation from DRS 142 (or algorithm) to migrate and power on the VM 105 in another host 102 within host cluster 101 or in another host cluster indicated by DRS 142. Migrating a VM to a new host or host cluster may allow for a change in the compute resources that the VM runs on.

As described in more detail below with respect to FIG. 2, each hardware platform 108 of each host 102 includes physical resources of a computing device, such as a memory, a processor, accelerators, local storage, a disk interface, and/or a network interface. As discussed, physical resources of each host 102 can be abstracted into a number of VMs 105 by hypervisor 106, such that the physical resources of the host may be shared by VMs 105 residing on that respective host 102. Hypervisors 106 decouple the underlying physical hardware (such as CPU(s), memory, disks, input/output (I/O), etc. of a single physical server) from a VM 105. Hypervisors 106 hide the actual hardware resources of the physical server from partitioned VMs 105 and project the impression of a common pool of logical resources that can be shared among these VMs 105 for operation. For example, a physical processor can be divided into a plurality of virtual processors, a physical accelerator can be divided into a plurality of virtual accelerators, etc. The division may be dividing use of the physical resource by time, by allocating certain physical resources to certain logical resources, etc., as is well known in the art.

Figure 2:
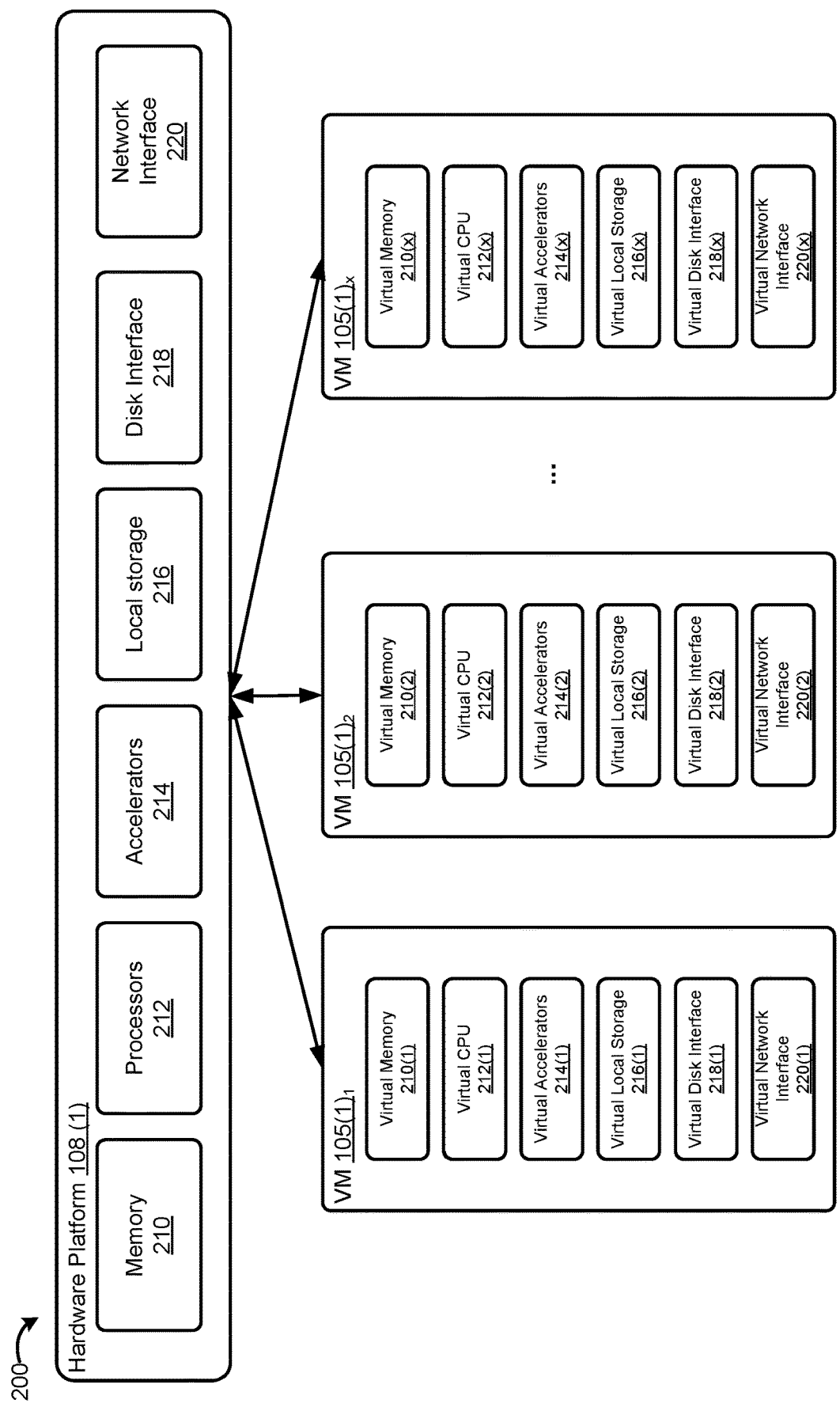
FIG. 2 is an illustration of resource allocation among virtual endpoints in a host according to embodiments of the present disclosure.

FIG. 2 is an illustration of resource allocation among virtual endpoints in a host according to embodiments of the present disclosure. FIG. 2 depicts an enlarged view of example host 102(1) of FIG. 1, constructed on hardware platform 108(1), that is configured to provide a virtualization layer (e.g., hypervisor 106(1) not shown) that abstracts physical (e.g., hardware) resources of hardware platform 108(1) into VMs $105(1)_1$-$105(1)_x$. The physical resources of hardware platform 108(1) may include memory 210, processor 212, accelerator 214, local storage 216, disk interface 218, and network interface 220.

As shown, the physical resources are abstracted/divided into a number of logical resources, including virtual memories 210, virtual CPUs 212, virtual accelerators 214, virtual local storages 216, virtual disk interfaces 218, virtual network interfaces 220, etc. Though each VM 105 is shown allocated the same number of logical resources, it should be understood that different VMs 105 may be allocated different numbers of logical resources (e.g., different numbers of virtual CPUs, different amounts of virtual memory, etc.). In certain embodiments, the number (e.g., maximum number) of logical resources of a given type on a given host may be defined/limited. For example, a given host 102 may be defined as supporting a maximum of 10 virtual CPUs, such as based on the physical resources of the host.

In certain aspects, resources, whether logical or physical, are allocated to a VM based on a defined configuration of the VM, such as defined by an administrator. In certain aspects, a defined configuration of a VM includes a configured resource demand, corresponding in certain aspects to a "desired state," which indicates for one or more resource types, an amount of each resource type and a number of resources of each resource type that should be allocated to the VM For example, a VM 105's desired state may require two persistent memory (PMem) devices and one normal memory device and further require that each device be at least 1 GB in size and preferably 2 GB in size.

In certain aspects, the "desired state" may be considered by DRS 142 as an aspirational amount of resources, which may be an amount of resources for one or more particular resource types to allocate to the VM, such as to ensure both optimal performance and efficiency of the VM. In certain aspects, the defined configuration of a VM also includes a minimum resource demand, which indicates for one or more resource types, a number of resources of each resource type that is minimally required for the VM to operate, such as for example at the performance the VM is currently operating at. In another example, the minimum resource demand may be a number of resources of each resource type that is minimally required for the VM to operate at all (e.g., potentially less than at the performance the VM is currently operating at). The minimum resource demand typically indicates fewer resources than the desired state. In some cases, a VM is considered as having a degraded configuration when the number of resources for each resource type allocated to the VM does not satisfy the requirements of the desired state.

Resources a VM desires or resources a VM requires may include resources for correctness (e.g., a CPU), resources for redundancy (e.g., copies of disks), resources for durability (e.g., secondary storage), resources for performance, and resources for some optional function (e.g. license key).

As discussed herein, DRS 142, such as based on a triggering event for a VM, may attempt to select and recommend placement of a VM on a host 102 (e.g., of host cluster 101) in a manner where the configured resource demand/desired state of the VM is achieved. For example the DRS 142 attempts to find a host 102 with enough available resources to allocate to the VM 105 to allow the VM to achieve its desired state. However, there may not always be a host 102 with sufficient resources to achieve the configured resource demand/desired state. In such cases, conventional techniques may not place/power on the VM accordingly, thereby leading to delay/failure of the VM to run.

Accordingly, techniques discussed herein allow VMs to be placed on a host 102 even when the host 102 does not have sufficient available resources to allocate to the VM to meet the configured resource demand/desired state of the VM. A host 102 may not have sufficient available resources when the host 102 does not have sufficient amount of available resources and/or a sufficient amount of resources of a resource type to allocate to the VM to meet the configured resource demand or desired state of the VM. DRS 142 may select a host 102 with insufficient available resources to allocate to the VM to meet the desired state, and recommend placement of the VM on the host 102. DRS 142 may allocate less resources than indicated in the desired state of the VM to the VM, but in some cases at least enough resources to meet the minimum resource demand of the VM. Accordingly, the VM runs in a degraded configuration.

In some aspects, a host 102 may have sufficient available resources to allocate to the VM to meet the configured resource demand/desired state of the VM; however, host 102 may not have enough resources for all VMs, and a decision to allocate more resources to other VMs over this VM may be made. The decision may be based on relative priorities, or other policies, of the VMs. In such a case, while host 102 has sufficient available resources, DRS 142 may allocate less than sufficient resources to the VM or decide altogether not to allocate resources to this VM. In some cases, the DRS 142 may take resources away from other VMs to allocated resources to this VM, such as when a priority of this VM is high relative to priorities of the other VMs.

In some aspects of techniques described herein, DRS 142 may later, such as based on another triggering event, allocate more resources to a VM running in a degraded configuration, such as to try to achieve the desired state for the VM. In some cases, allocation of additional resources occurs while the VM is powered on. In some other cases, for some resources and for some guest OSs, allocation of additional resources is not possible while the VM is powered on and, instead, the VM is powered off, reconfigured with the additional resources, and then powered back on.

In certain aspects, DRS 142 selects a host 102 for a VM using any suitable algorithm or heuristic, such as to meet the desired state for the VM. For example, DRS 142 may try and balance VM placement among hosts 102. In certain aspects, DRS 142 selects a host 102 for a VM using any suitable algorithm or heuristic, such as when there is not a host 102 that has enough available resources to meet the desired state for the VM. For example, DRS 142 may try and find a host 102 with available resources closest to the desired state for the VM and/or that at least has available resources that meet the minimum resource demand for the VM. DRS 142 may also anticipate future demand and/or changes in resources. For example, DRS 142 may decide to recommend placement of a VM 105 on a sub-optimal host or allocate less resources than available to a VM 105 in anticipation of other VMs 105 powering on or off (i.e., anticipate scenarios causing a capacity change among resources).

One triggering event for placing a VM is a failover. As discussed, DRS 142 enhances the overall usage of the cluster as it works to balance resource allocation on available hosts 102 by recommending placement and migration of VMs 105 on hosts 102 in an intelligent way that takes into consideration available capacity. DRS 142 may be useful during different triggering events, such as when a VM 105 is first powered on and needs to be placed in the virtualized infrastructure, during a host cluster capacity change, during a failover operation, etc.

Failover operations include restarting a VM on an already active host or switching to a redundant or standby computer server, system, hardware component or network upon the failure or abnormal termination of the previously active application, server, system, hardware component, or network. The main purpose of a failover may be to eliminate, or at least reduce, the impact on users when a system failure occurs. Accordingly, failover operations are used to protect VMs 105 in case of host 102 failure, providing HA for critical VMs 105. If one of the hosts 102 within cluster 101 fails (e.g., a host/server goes into maintenance mode or is unpredictably powered off), then the VMs 105 that were running on the failed host 102 are migrated to other, healthy hosts 102 in the failover process. More specifically, HA module(s) 114 will restart the VMs 105 that were allocated for that particular host 102 into other, healthy hosts 102, and when DRS 142 is configured on top of HA, DRS 142 makes sure that the protected VMs 105 get properly balanced to the remaining hosts 102. Once the offline host 102 is powered back on, DRS 142 recommends migration of one or more VMs 105 to the host 102, keeping the cluster balanced. Without DRS 142, an administrator would manually balance out the VMs 105 around the cluster.

In some cases however, HA failover may fail due to insufficient resources among hosts 102 in the host cluster. For example, when a VM 105 is using PMem (e.g., configured with a PMemdisk), storage of the VM 105 is host-local. Therefore, the VM 105 may not be allowed to failover given the available healthy hosts 102 do not have resources which support PMem of the VM 105 (PMem is not available on any new host 102 to allow failover of the VM 105). Similarly, HA failover may also fail where available healthy hosts 102 are inadequate to supply resources for the configured GPU/CPU requirement of the failed VM 105.

Figure 3:
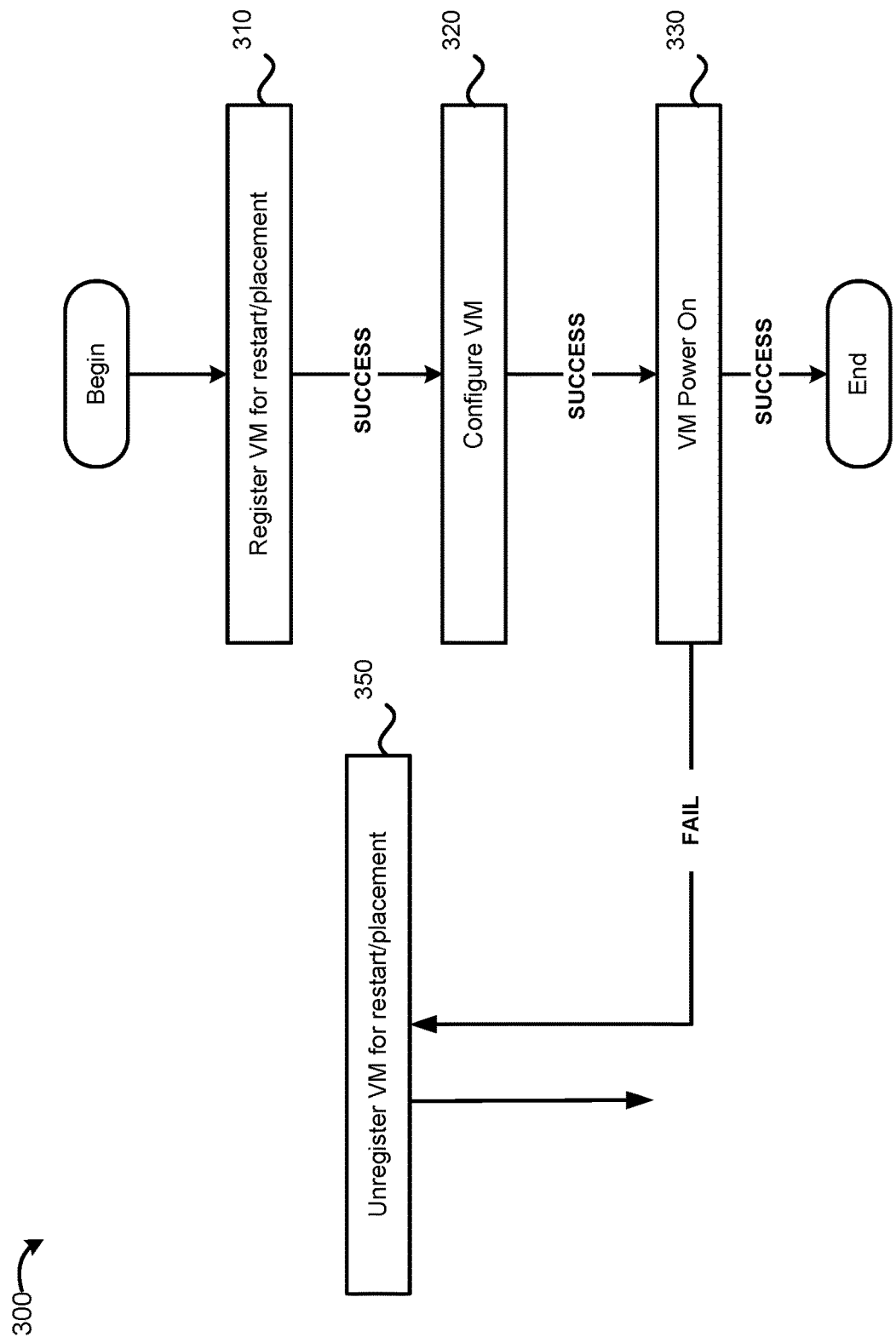
FIG. 3 depicts an example of a conventional workflow for restarting a virtual machine (VM) when available resources across components in a network are inadequate to meet configured resource demands of the VM.

FIG. 3 depicts an example of a conventional workflow 300 for restarting a VM when available resources across components in a network are inadequate to meet configured resource demands of the VM. The workflow of FIG. 3 may begin when, for example, a master HA module 114 detects a host failure of host 102, VM failure of VM 105, and/or network outage (e.g., host failure due to host reboot or VM failure due to a corrupt VMX configuration, an APD situation, or PDL). The master HA module 114 may identify a failed VM 105 (or multiple failed VMs).

At 310, the master HA 114 registers the VM 105 for restart on another host 102 within the host cluster 101 or within another host cluster.

DRS 142 determines the configured resource demands of the failed VM 105 (e.g., configured resource demand/desired state of the VM 105) in order to locate host(s) 102 for the failed VM 105. In an embodiment, when a host 102 is located, at 320, the VM is configured to its desired state and recommends migration of the failed VM to the new host. In another embodiment, DRS 142 may set a policy on VM 105 that instructs another component how to configure VM 105 when or before it is migrated. The other designated component may implement the policy when appropriate. For example, DRS 142 may set a configuration policy for a VM 105 in advance, and host 102 (or another component) may configure the VM 105 before migration of the VM 105. In another example, where VM 105 is live and being migrated to a target host 102, a component that manages the virtual motion on the target host 102 may configure VM 105, according to a policy set by DRS 142.

Configuration of the VM 105 by a component other than DRS 142 may be advantageous in some scenarios. For example, in HA clusters, a network partition may create two groups of hosts. The hosts 102 in each group may able to communicate with each other in the group, but not with hosts 102 in the other group. DRS 142 running on virtualization manager 140 may only be able to communicate with one group. Therefore, DRS 142 pre-configuring a configuration policy in this example may allow for VMs 105 in the other group to be configured by host 102 before being powered on, thereby ensuring more VMs 105 are recovered after a failure.

An HA module 114 at the new host 102 may successfully power on the VM, at 330, if the new host 102 has sufficient available resources for the desired state of the VM 105. However, if DRS 142 deems capacity to be inadequate across available hosts 102 (e.g., resources of each available host 102 are inadequate to meet the configured resource demand of the failed VM 105), DRS 142 raises an event stating that it does not have enough resources to power on the VM 105. Thus, at 330, a VM 105 may fail to be powered on by an HA module 114 because sufficient resources to meet the configured demand of the VM 105 do not exist.

At 350, the master HA module 114 unregisters this VM 105 for restart. In such a case, the VM 105 suffers downtime until a new host 102 is powered on or a resource change among existing hosts 102 occurs.

As described in more detail below with respect to FIGS. 4 and 5, dynamic configuration of VMs may be introduced to eliminate the downtime of VMs during scenarios where resources among hosts in a host cluster are insufficient to meet the configured resource demand of one or more VMs. In addition, dynamic configuration may allow a VM running in a degraded state to be upsized to a desired state. DRS may consider the resource availability among hosts and usage requirements of VMs in response to a triggering event to make informed decisions about VM configuration. Based on the information extracted by DRS, a VM may be "right sized" according to what resources are available and what resources the VM demands.

Figure 4:
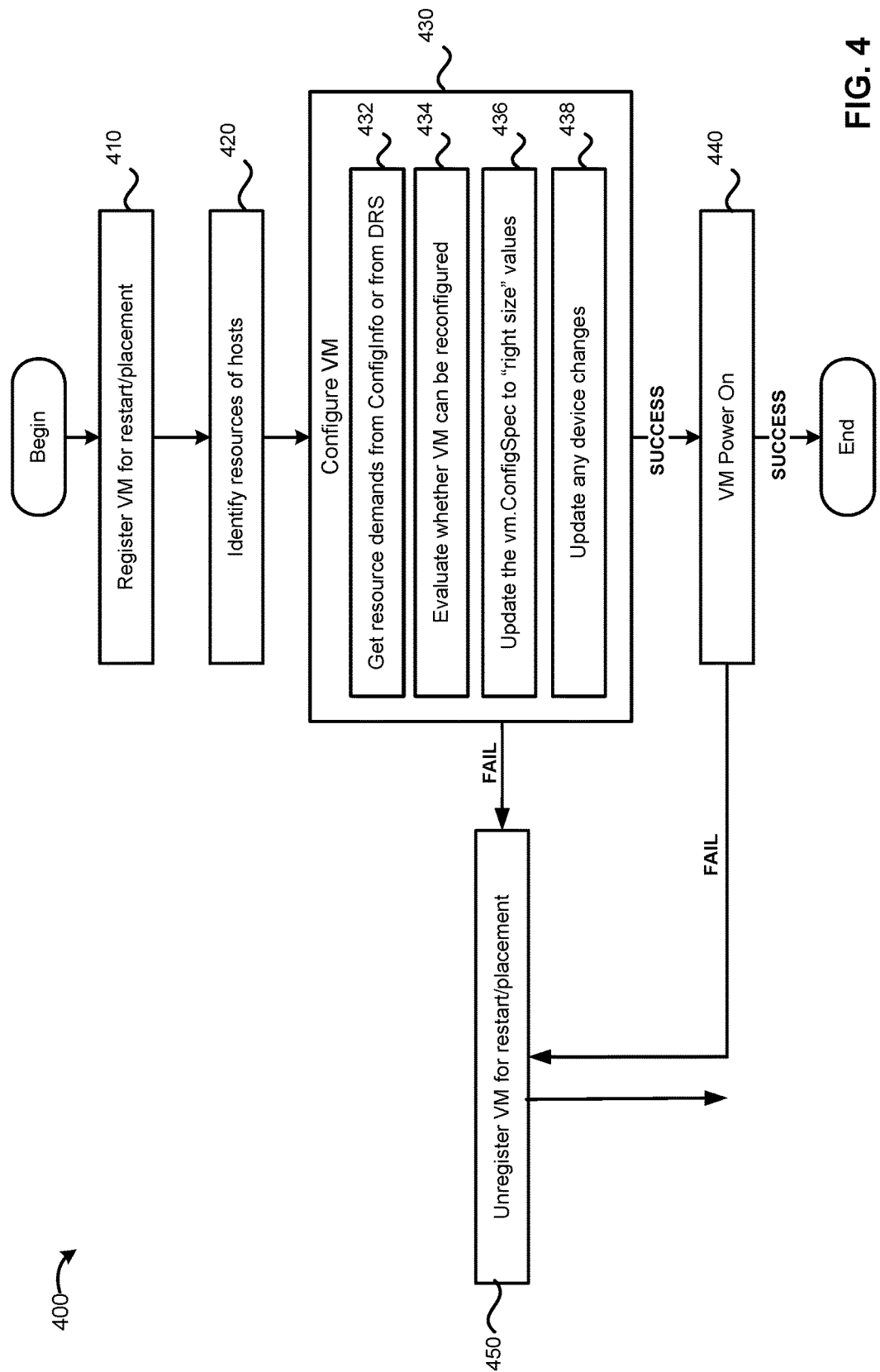
FIG. 4 depicts an example of a workflow for VM configuration based on resource availability among components in a network according to embodiments of the present disclosure.

FIG. 4 depicts an example of a workflow 400 for VM configuration based on resource availability among components in a network according to embodiments of the present disclosure. Configuration of a VM may occur based on a triggering event, such as in scenarios where there has been a change to either VM workloads or host resources. In an example, VM configuration may be introduced in scenarios where a VM is initially powered on because while host resources remain consistent, VM workloads are increased due to the presence of a new VM in the virtualized infrastructure. In another example, configuration may be introduced in scenarios where a master HA module detects a host failure, VM failure, and/or network outage resulting in a decline of available resources that may be allocated to one or more VMs. In another example, configuration may be may be introduced in scenarios where a new host is powered on. The addition of a new host in the host cluster increases the number of allocable resources and further enables DRS to recommend migration of VMs proactively thereby increasing performance of one or more VMs and making room in the cluster to accommodate future workload demand. While these examples are only representative of a few triggering events where VM configuration may be introduced, the VM configuration described herein may apply in other scenarios.

As shown in FIG. 4, at 410, the VM 105 is registered for a restart or placement on a host 102. For example, a master HA 114 registers the VM 105 for restart/placement on the current host 102, on another host 102 within the host cluster 101, or on another host 102 within another host cluster.

At 420, available resources of hosts 102 (e.g., candidate hosts) are identified. For example, DRS 142 identifies resources of hosts 102 within the host cluster 101 or another host cluster. For example, in certain embodiments, DRS 142 monitors the distribution of compute, memory, power, storage, and/or network resources for all hosts 102 and VMs 105 in a cluster. In certain embodiments, DRS 142 takes into account available resources and a desired resource utilization (e.g., all VMs 105 operating in their respective desired states). Based on this information, DRS 142 is able to identify hosts 102 with available resources capable of supporting the VM 105.

At 430, DRS 142 determines whether to configure the VM 105 for the host 102, whether a VM 105 is capable of being configured, and the configuration. At 432, DRS evaluates a minimum resource demand of the VM 105 and a desired state of the VM 105. DRS 142 may evaluate the minimum resource demand based on the VM 105's current resource usage and predicted future resource usage. DRS 142 may evaluate the desired state of the VM 105 based on its initial configuration. The minimum resource demand and desired state of the VM 105 helps DRS 142 determine whether a host 102 is capable of supporting performance of the VM 105 in its desired state or, at a minimum, meets the resource demand.

If DRS 142 determines a host 102 capable of supporting the desired state of the VM 105 is available, the VM 105 may be configured to use the desired state. For example, if the VM 105 is undergoing an initial configuration of VM 105 or the VM 105 is already running at the desired state, the VM 105 is configured to use the desired state. If VM 105 is currently running in a degraded configuration, it is upsized. Upsizing the VM 105 includes increasing resources for one or more resource types allocated for the VM 105. If DRS 142 determines available hosts 102 in the do not have enough resources to satisfy the desired state of the VM 105, the VM 105 may be configured to run in a degraded configuration. For example, if the VM 105 is undergoing an initial configuration of VM 105 or the VM 105 is already running in a degraded configuration, the VM 105 is configured to use a degraded configuration. If VM 105 is currently running in a desired state or a degraded configuration with more resources, it is downsized. Downsizing the VM includes decreasing resources for one or more resource types allocated for the VM.

In some aspects, upsizing and downsizing includes reconfiguring the topology of the VM. For example, a VM may have its vCPUs placed in a particular way across sockets and physical cores/threads. Although DRS 142 may determine a destination host 102 has a sufficient amount of available CPU resources to allocate to the VM, the available CPU resources may not match the topology of the VM as expressed in the desired state of the VM. Accordingly, the VM may be configured prior to placement on the destination host 102.

At 434, prior to configuration, DRS 142 determines whether the VM 105 is capable of being configured. In some cases, DRS 142 evaluates the specified configuration settings to determine whether an administrator configured the VM 105 to allow for dynamic configuration. An administrator may have the ability to specify certain requirements and preferences of the VM 105, including rules for configuration. In other words, based on a policy of the VM 105, created by the administrator, DRS 142 may be able to determine whether configuration of the VM 105 is permitted.

In some cases, at least one application running in a guest OS in the VM 105 may inform a hypervisor of the host 102 VM 105 is being configured on, the hypervisor informing DRS 142, as to whether configuration is permitted. For example, the application may indicate a disk the VM 105 is configured with is no longer useful to run the application and subsequently inform the hypervisor that configuration of the VM 105 may be modified to remove this disk. Resources the application deems necessary for performance may dynamically change and, thus, the application may continuously update the hypervisor regarding changes to rules for configuration of the VM 105.

In some cases, the hypervisor may determine whether configuration of the VM 105 is permitted. The hypervisor may have knowledge of resources required to run the application and, therefore, can make decisions regarding configuration of the VM 105. The hypervisor communicates with DRS 142 to indicate whether the VM 105 may be configured and by how much.

In some cases, DRS 142 determines the VM 105 may not be configured. In a scenario where there are not enough resources in the host cluster to satisfy the configured resource demand or desired state of the VM 105, configuration of the VM 105 fails, and, at 450, the master HA module 114 unregisters this VM 105 for restart until a next capacity change occurs. However, in a scenario where there are enough resources in the host cluster to satisfy the configured resource demand or desired state of the VM 105, the VM 105 may not need to be configured (e.g., may skip steps 436 and 438 in FIG. 4) and may be successfully powered on in a new host 102. In this scenario the inability of the VM 105 to be configured may not hinder performance of the VM 105 (i.e., the VM may not suffer unnecessary downtime).

In some cases, DRS 142 determines the VM 105 may be configured. DRS 142 may inform the hypervisor as to the "right size" of the VM 105. A "right size" of the VM 105 may take into consideration the VM's desired state, the VM's degraded state (if applicable), the VM's minimum resource demand (if defined), as well as available resources (and types of resources) among hosts in the virtualized infrastructure. In an example, right sizing the VM includes decreasing the resource configuration (e.g., decreasing the number and/or types of resources to allocate to the VM) of the VM 105 when no host 102 is available to support the current desired state of the VM 105. The VM 105 may be configured to perform in a degraded state. The VM's configuration may require less resources and allow the VM 105 to be powered on in a host 102 that could not meet its desired state. In another example, right sizing the VM includes increasing the resource configuration of the VM when a host is available to support the desired state of the VM and where the host has additional resources which are not being exploited. VMs struggling with performance using their current resource configuration may be considered for upsizing.

At 436, the hypervisor updates the vm.ConfigSpec of the VM 105 to "right size" values indicated to the hypervisor by DRS 142.

At 438, the hypervisor updates any device changes.

At 440, an HA module 114 on the host system 102, where the VM 105 was migrated to, initiates the restart process of the VM 105. In this manner, the HA module 114, DRS 142, and hypervisor 106 ensure VMs 105 are configured such that guest applications running within the affected VMs remain operational and do not suffer unnecessary downtime. In some cases, powering on VM 105 may fail where the configuration operation fails. For example, the configuration file may be corrupt or the component that is expected to carry out configuration of the VM 105 fails.

Figure 5:
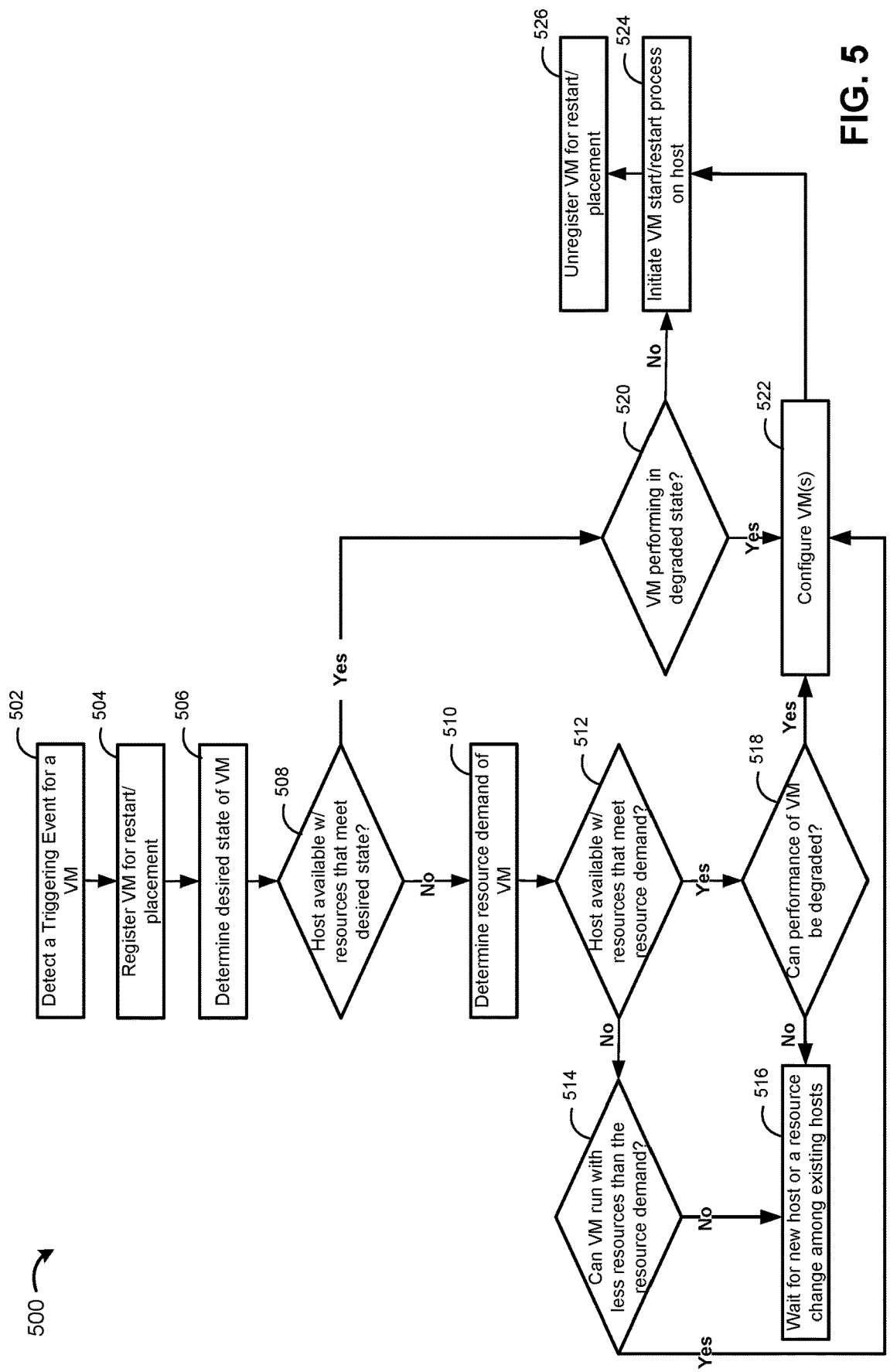
FIG. 5 depicts an example of a workflow for VM configuration based on resource availability among components in a network according to embodiments of the present disclosure.

FIG. 5 depicts an example of a workflow 500 for VM 105 configuration based on resource availability among components in a network according to embodiments of the present disclosure. Workflow 500 provides additional steps beyond workflow 400 for determining when to configure a VM, whether to downsize or upsize the VM, and how to determine the correct resource configuration.

At 502, a triggering event is detected by the DRS 142. The triggering event may correspond to a capacity change in the virtualized infrastructure.

At 504, the VM 105 is registered for restart or placement/replacement. A master HA 114 may register the VM 105 for restart/placement on the same host 102 (i.e., that has experienced a resource adjustment), another host 102 within the host cluster, or on another host within another host cluster.

At 506, the desired state of the VM 105 is determined. DRS 142 may determine a desired state of the VM 105 based on its initial configuration.

At 508, DRS 142 determines whether there is a host available that meets resource demands of the desired state of the VM 105. In an illustrative example, where a VM 105 is initially configured with four vCPUs (e.g., desired state of the VM 105 is configured with four vCPUs), DRS 142 searches for a host 102 with a minimum of four vCPUs that are not being used (i.e., are not allocated to other VMs 105 running in the host 102) and can be allocated to the VM 105 if migrated to that host 102.

If DRS 142 deems capacity to be inadequate across available hosts 102 (e.g., resources of each available host 102 are inadequate to meet the desired state of the VM 105), at 510, DRS 142 determines the minimum resource demand of the VM 105, at 512. DRS 142 may evaluate the minimum resource demand of the VM 105 based on its current resource usage and predicted future resource usage. Returning to the illustrative example, where the VM 105 is using two vCPUs, although the VM's 105 desired state is four vCPUs, DRS 142 searches for a host 102 with a minimum of two CPUs that are not being used and can be allocated to the VM 105 if migrated to that host 102.

If DRS 142 is not able to locate a host 102 suitable to support the minimum resource demand of the VM 105, at 512, then at optional 514 (otherwise operations may proceed to 516) DRS 142 determines whether VM 105 can run with less resources than the minimum resource demand, such as when the minimum resource demand relates to a current performance of the VM as opposed to an actual minimum required to run. DRS 142 may make this determination based on a decision by a customer (e.g., a policy may be enabled to empower a customer to make a decision as to whether or not the VM may operate with less resources than its minimum resource demand). Returning to the illustrative example of the VM 105 configured with four vCPUs (e.g., in its desired state) that is using only two vCPUs (e.g., its minimum resource demand), if a host 102 with only 1 vCPU is available, then in such a case, a customer may decide whether the VM 105 is allowed to run with less resources than its minimum resource demand.

If VM 105 cannot run with less resources than the minimum resource demand, then at 514 DRS 142 raises an event stating that it does not have enough resources to power on the VM 105, and the VM 105 waits until a new host 102 is available or a change in resource availability occurs among existing hosts 102 (e.g., an APD or PDL situation ending). If VM 105 can run with less resources than the minimum resource demand, then at 522, the VM 105 may be configured. In this case, configuring the VM 105 may comprise "downsizing" the VM 105 (e.g., decreasing resources configured for the VM 105).

If DRS 142 is able to locate a host 102 suitable to support the minimum resource demand of the VM 105, at 510, then at 518, DRS 142 determines whether the VM 105 is capable of being degraded. Whether a VM 105 is capable of being degraded, such as whether the VM 105 can be downsized, may be, for example, specified in requirements and preferences of the VM 105 configured by an administrator during configuration of the VM 105, indicated by at least one application running in the guest OS in the VM 105, or indicated by the hypervisor 106. Returning to the illustrative example of the VM 105 configured with four vCPUs (e.g., in its desired state) that is using only two vCPUs (e.g., its minimum resource demand), the VM 105 may be configured to a degraded state with 2vCPUs if a policy of the VM 105 allows for degradation of performance of the VM 105.

If a VM 105 has been previously degraded to its minimum resource demand, further degradation is not necessary. Instead, (not shown in FIG. 5) DRS 142 may recommend migration of the VM 105 to its new host 102 with resources available to meet the minimum resource demand. An HA module 114 may initiate restart of the VM 105 on the new host 102 and unregister the VM 105 from the list of VMs for restart/placement.

If a VM 105 is not able to be configured, not able to be degraded, or both, at 516, DRS 142 may raise an event stating that it does not have enough resources to power on the VM 105 and wait for a new host 102 or resource capacity change.

If a degradation of the VM 105 is allowed, at 522, the VM 105 may be configured. In this case, configuring the VM 105 may comprise "downsizing" the VM 105 (e.g., decreasing resources configured for the VM 105 such that the VM 105 is in a degraded state).

At 524, DRS 142 may recommend migration of the configured (e.g., downsized) VM 105 to its new host 102 with available resources and an HA module 114 may initiate restart of the VM 105 on the new host 102.

At 526, the HA master 114 may unregister the VM 105 for restart/placement at some later time after a failure.

Returning to step 508, if DRS 142 deems capacity to be adequate on at least one host 102 across available hosts 102 (e.g., resources of at least one host 102 are adequate to meet the desired state of the VM 105), at 520, DRS 142 determines whether the VM 105 is in a degraded state (e.g., any state configured for the VM 105 that is less than the desired state of the VM 105). At a previous time, the VM 105 may have been configured to a degraded state in order to enable restart of the VM 105 on a host 102. Therefore, at 520, DRS 142 determines whether the VM 105 is performing in such a degraded state.

When DRS 142 determines the VM 105 is not performing in a degraded state, configuration of the VM 105 may not be necessary and DRS 142 may recommend migration of the VM 105 to a new host to be restarted, at 524, and may be unregistered by the HA master 114, at 526.

When DRS 142 determines the VM 105 is performing in a degraded state, at 522, the VM 105 may be configured. In this case, configuring the VM 105 may comprise "upsizing" the VM 105 (e.g., configuring the VM 105 with additional resources).

At 524, DRS 142 may recommend migration of the configured VM 105 to its new host 102 with available resources, and an HA module 114 may initiate restart of the VM 105 on the new host 102.

At 526, following successful power on of the VM 105 on the new host 102, the HA master 114 may unregister the VM 105 for restart/placement.

In some cases, DRS 142 may not be able to locate a host 102 suitable to support the desired state of the VM 105 but may be able to locate a host 102 with available resources suitable to support more than the minimum resource demand of the VM 105. For example, for a VM 105 configured with sixty-four vCPUs (e.g., in its desired state) using only eighteen vCPUs, DRS 142 may not be able to locate a host 102 with sixty-four available vCPUs but may be able to locate a host 102 with forty-eight available vCPUs, which is above the minimum resource demand (e.g., eighteen vCPUs) of the VM 105. In this case, the VM 105 may be configured with the greatest amount of resources that are available among hosts 102 in the virtualized infrastructure. For the example given, the VM 105 may be configured to have forty-eight vCPUs so that it can restart in the available host 102 while still performing as close to its desired state as possible.

As discussed herein, when a VM 105 is using PMem (e.g., configured with a PMemdisk), storage of the VM 105 is host-local, and the VM 105 may not be allowed to failover given the available healthy hosts do not have resources which support PMem of the VM 105 (PMem is not available on any new host 102 to allow failover of the VM). However, dynamic configuration of VMs 105 may help to eliminate the downtime of VMs 105 during such scenarios. A guest OS of the VM 105 may have a cache for this PMem disk; therefore, configuration of the VM 105 may help to rehydrate a cache on a new host 102 (or recreate PMem on the new host 102) without the need for availability of an identical PMem disk on a new host 102.

According to certain aspects, placement policies may provide a trade-off in satisfying desired state resource amounts or desired state resource types when available resources of a host 102 are insufficient to provide both. For example, according to one policy, a VM 105 is placed on a host 102 that provides all desired amounts of CPU and memory resources, but that does not provide any GPU resources. According to another policy, the VM 105 is placed on a host 102 that has available CPU, memory, and GPU resources, but that is only able to partially satisfy the desired amounts of CPU and memory resource of the VM 105.

Certain aspects of the present disclosure may be similarly applied to other suitable virtualized objects, for example, including virtual disks. For example, a desired state of a virtual disk may specify that for optimal performance of the virtual disk it needs to be replicated in such a manner that two node failures may be tolerated. If DRS 142 deems resources of each available host 102 are inadequate to meet the desired state of the virtual disk, according to certain aspects of the present disclosure, performance of the virtual disk may be degraded to operate in a host 102 that provides tolerance for a single node failure, given a host 102 with such resources is available.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for dynamic configuration of virtual objects in a networking environment comprising:
   detecting a triggering event for configuring a virtual object, the virtual object being associated with a desired state defining a first plurality of resources for allocating to the virtual object, wherein the first plurality of resources comprises a persistent memory storing data;
   determining that each of a plurality of hosts does not have sufficient available resources to allocate the first plurality of resources to the virtual object according to the desired state;
   selecting a first host of the plurality of hosts to run the virtual object;
   dynamically reconfiguring the virtual object from storing the data in the persistent memory to storing the data in a cache of the first host;
   allocating a second plurality of resources to the virtual object from the first host, wherein the second plurality of resources is less than the first plurality of resources; and
   running the virtual object in the first host using the allocated second plurality of resources.

2. The method of claim 1, wherein the first plurality of resources correspond to one or more resource types and determining that each of the plurality of hosts does not have sufficient available resources comprises determining that each of the plurality of hosts does not have sufficient available resources corresponding to the one or more resource types of the first plurality of resources.

3. The method of claim 1, wherein:
   a distributed resource scheduler (DRS) determines sufficiency of available resources of the plurality of hosts and sets a policy for allocating the second plurality of resources to the virtual object; and
   the DRS or another component in the networking environment allocates the second plurality of resources to the virtual object based, at least in part, on the policy set by the DRS.

4. The method of claim 1, further comprising:
   determining that at least one host of the plurality of hosts has sufficient available resources to allocate a third plurality of resources associated with a minimum state for the virtual object, wherein the second plurality of resources are more than or equal to the third plurality of resources.

5. The method of claim 4, wherein the at least one host of the plurality of hosts having sufficient available resources to allocate the third plurality of resources is more than one host, and wherein selecting the first host of the plurality of hosts to run the virtual object includes selecting a host of the more than one host with a greatest amount of available resources matching the third plurality of resources.

6. The method of claim 4, wherein the at least one host of the plurality of hosts having sufficient available resources to allocate the third plurality of resources is more than one host, and wherein selecting the first host of the plurality of hosts to run the virtual object includes selecting a host of the more than one host with available resources matching a greatest amount of one or more resource types of the third plurality of resources.

7. The method of claim 1, further comprising:
   determining that each of the plurality of hosts does not have sufficient available resources to allocate a third plurality of resources associated with a minimum state for the virtual object;
   determining whether the virtual object is capable of running with less resources than the third plurality of resources; and
   when the virtual object is not capable of running with less resources than the third plurality of resources, refraining from allocating resources to the virtual object until a change in available resources occurs.

8. The method of claim 1, further comprising:
   determining that at least one of the plurality of hosts has sufficient available resources to allocate a third plurality of resources greater than the second plurality of resources; and
   allocating the third plurality of resources to the virtual object from the at least one host.

9. The method of claim 1, further comprising:
   determining a sufficiency of the available resources of the plurality of hosts for a plurality of virtual objects in the networking environment; and
   determining resources available to allocate to the virtual object based, at least in part, on a on a relative priority of the virtual object compared to other virtual objects.

10. The method of claim 1, wherein the triggering event comprises:
    a host failure;
    a host initial boot or reboot;
    a virtual object failure;
    a virtual object initial boot or reboot;
    migration of a virtual object from at least one host to another host in the plurality of hosts;
    a change in policies or priorities among one or more virtual objects;
    a change in configuration of one or more virtual objects;
    a change in minimum state of one or more virtual objects; or
    an outage in the networking environment.

11. The method of claim 1, further comprising deciding to allocate the second plurality of resources to the virtual object based, at least in part, on determining whether the virtual object is capable of running with less resources than the first plurality of resources associated with the desired state of the virtual object.

12. The method of claim 11, wherein determining the virtual object is capable of running with less resources than the first plurality of resources associated with the desired state of the virtual object is based on:
    a policy of the virtual object created by an administrator;
    a determination by an application running in a guest operating system (OS) of the virtual object;
    a determination by a hypervisor of the first host; or
    a combination thereof.

13. The method of claim 1, further comprising:
    migrating the virtual object from a previous host to the first host or initiating the virtual object on the first host prior to allocating the second plurality of resources to the virtual object.

14. The method of claim 1, wherein the virtual object comprises a virtual machine (VM), a virtual computing instance (VCI), or a virtual disk.

15. A non-transitory computer readable medium comprising instructions that, when executed by one or more processors of a computing system, cause the computing system to perform a method for dynamic configuration of virtual objects in a networking environment, the method comprising:

detecting a triggering event for configuring a virtual object, the virtual object being associated with a desired state defining a first plurality of resources for allocating to the virtual object, wherein the first plurality of resources comprises a persistent memory storing data;

determining that each of a plurality of hosts does not have sufficient available resources to allocate the first plurality of resources to the virtual object according to the desired state;

selecting a first host of the plurality of hosts to run the virtual object;

dynamically reconfiguring the virtual object from storing the data in the persistent memory to storing the data in a cache of the first host;

allocating a second plurality of resources to the virtual object from the first host, wherein the second plurality of resources is less than the first plurality of resources; and running the virtual object in the first host using the allocated second plurality of resources.

16. The non-transitory computer readable medium of claim 15, wherein the first plurality of resources correspond to one or more resource types and determining that each of the plurality of hosts does not have sufficient available resources comprises determining that each of the plurality of hosts does not have sufficient available resources corresponding to the one or more resource types of the first plurality of resources.

17. The non-transitory computer readable medium of claim 15, wherein the method further comprises:

determining that at least one host of the plurality of hosts has sufficient available resources to allocate a third plurality of resources associated with a minimum state for the virtual object, wherein the second plurality of resources are more than or equal to the third plurality of resources.

18. The non-transitory computer readable medium of claim 17, wherein the method further comprises:

determining that at least one of the plurality of hosts has sufficient available resources to allocate a fourth plurality of resources greater than the second plurality of resources; and allocating the fourth plurality of resources to the virtual object from the at least one host.

19. A system comprising one or more processors and a non-transitory computer readable medium comprising instructions that, when executed by the one or more processors, cause the system to perform a method for dynamic configuration of virtual objects in a networking environment, the method comprising:

detecting, by a high availability (HA) module, a triggering event for configuring a virtual object, the virtual object being associated with a desired state defining a first plurality of resources for allocating to the virtual object, wherein the first plurality of resources comprises a persistent memory storing data;

determining, by a distributed resource scheduler (DRS), that each of a plurality of hosts does not have sufficient available resources to allocate the first plurality of resources to the virtual object according to the desired state;

selecting, by the DRS, a first host of the plurality of hosts to run the virtual object;

dynamically reconfiguring the virtual object from storing the data in the persistent memory to storing the data in a cache of the first host;

allocating, by a hypervisor of the first host, a second plurality of resources to the virtual object from the first host, wherein the second plurality of resources is less than the first plurality of resources; and running, by the HA module, the virtual object in the first host using the allocated second plurality of resources.

20. The system of claim 19, wherein the first plurality of resources correspond to one or more resource types and determining that each of the plurality of hosts does not have sufficient available resources comprises determining that each of the plurality of hosts does not have sufficient available resources corresponding to the one or more resource types of the first plurality of resources.

\* \* \* \* \*